United States Patent
Cook et al.

(10) Patent No.: US 10,269,026 B2
(45) Date of Patent: Apr. 23, 2019

(54) GENERATING A LAYOUT OF PRODUCTS

(75) Inventors: Neil Cook, Cambridge, MA (US); Raymond Ferrara, Concord, MA (US)

(73) Assignee: One Door, Inc., Boston, MA (US)

( * ) Notice: Subject to any disclaimer, the term of this patent is extended or adjusted under 35 U.S.C. 154(b) by 126 days.

(21) Appl. No.: 12/788,456

(22) Filed: May 27, 2010

(65) Prior Publication Data

US 2011/0295764 A1  Dec. 1, 2011

(51) Int. Cl.
*G06Q 30/02* (2012.01)
*G06Q 10/06* (2012.01)

(52) U.S. Cl.
CPC ........... *G06Q 30/02* (2013.01); *G06Q 10/06* (2013.01); *G06Q 10/067* (2013.01)

(58) Field of Classification Search
USPC ................... 705/1.1, 300–301, 348
See application file for complete search history.

(56) References Cited

U.S. PATENT DOCUMENTS

| | | | |
|---|---|---|---|
| 6,026,377 A | 2/2000 | Burke | |
| 6,191,850 B1 | 2/2001 | Chiang | |
| 6,427,132 B1 | 7/2002 | 8owman-Amuah | |
| 7,124,101 B1 | 10/2006 | Mikurak | |
| 2003/0154141 A1* | 8/2003 | Capazario | G06Q 10/087 705/26.1 |
| 2005/0203790 A1* | 9/2005 | Cohen | 705/9 |
| 2006/0161465 A1* | 7/2006 | Ramakrishnan | 705/7 |
| 2006/0265489 A1 | 11/2006 | Moore | |
| 2007/0061211 A1 | 3/2007 | Ramer et al. | |
| 2008/0077511 A1* | 3/2008 | Zimmerman | G06Q 10/00 705/28 |
| 2009/0059270 A1* | 3/2009 | Opalach et al. | 358/1.15 |
| 2009/0119305 A1 | 5/2009 | Johnson et al. | |
| 2010/0010968 A1 | 1/2010 | Redlich et al. | |
| 2010/0138037 A1 | 6/2010 | Adelberg et al. | |
| 2010/0171826 A1* | 7/2010 | Hamilton | G06Q 30/06 348/135 |
| 2011/0295764 A1 | 12/2011 | Cook et al. | |
| 2012/0054242 A1 | 3/2012 | Ferrara et al. | |
| 2012/0296777 A1 | 11/2012 | Fugman et al. | |
| 2013/0006790 A1 | 1/2013 | Raskin et al. | |
| 2013/0076726 A1 | 3/2013 | Ferrara | |

OTHER PUBLICATIONS

Toung, DH Wal-Mart Stores, Inc.—Company Report, Dec. 8, 1997.*

* cited by examiner

Primary Examiner — Mehmet Yesildag
(74) Attorney, Agent, or Firm — Fish & Richardson P.C.

(57) ABSTRACT

Generating a product layout includes obtaining attributes of a retail location; correlating the attributes of the retail location to information relating to a product in order to determine whether the product is appropriate for the retail location; and if the product is appropriate for the retail location, generating a layout of the product within the retail location relative to like products according to one or more predefined rules.

18 Claims, 16 Drawing Sheets

| HOME | LOCATIONS | PROMOTIONS | FIXTURES | ITEMS | CRITICAL INFORMATION | REFERENCE | SURVEYS | REPORTS | ANNOUNCEMENTS | | | POGHOME | ADMIN | SETUP | LOGOFF:FERRARA | HELP |

☐ ALL ☐ LAUNCHED    NEW PROMOTION

PROMOTIONS: 1-10 OF 51 (SHOW ALL) >>

| NAME | START DATE | TYPE | PLACEMENT | LAUNCHED? | |
|---|---|---|---|---|---|
| IAIN TEST COPY | 5-22-2010 | NATIONAL | PLACEMENT | NO | DELETE |
| PRESCRIPTIVE PLACEMENT 2010-04-18 | 4-18-2010 | NATIONAL SUPPLEMENT | PLACEMENT | NO | DELETE |
| PRESCRIPTIVE PLACEMENT 2010-04-04 | 4-4-2010 | NATIONAL | PLACEMENT | NO | DELETE |
| PRESCRIPTIVE PLACEMENT 2010-03-21 | 3-21-2010 | NATIONAL SUPPLEMENT | PLACEMENT | NO | DELETE |
| PRESCRIPTIVE PLACEMENT 2010-03-07 | 3-7-2010 | NATIONAL SUPPLEMENT | PLACEMENT | NO | DELETE |
| FEBRUARY AUTO PUSH 2010-02-21 | 2-21-2010 | NATIONAL SUPPLEMENT | PLACEMENT | YES | DELETE |
| PRESCRIPTIVE PLACEMENT 2010-02-07 | 2-7-2010 | NATIONAL SUPPLEMENT | PLACEMENT | YES | DELETE |
| WINTER POST PROMOTION 2010-01-24 | 1-24-2010 | NATIONAL SUPPLEMENT | PLACEMENT | YES | DELETE |
| WINTER PROMOTION 2010-01-10 | 1-10-2010 | NATIONAL | PLACEMENT | YES | DELETE |
| DECEMBER 30TH AUTO PUSH 2010-01-01 | 1-1-2010 | NATIONAL SUPPLEMENT | PLACEMENT | YES | DELETE |

Configuration displays for devices and accessories.

<u>Device references</u>

<u>Accessory references</u>

Device / Accessory association

To place accessories with their devices, the two must be associated with each other. The relative priority of the accessories may also be set.

<u>Set device / accessory associations and priorities</u> — 42

SKU Substitutions — 46

You can designate alternate SKUs to use if a SKU runs out.

55 — <u>Designate alternate SKUs</u>

Accessory SKUable categories

Accessory fixture types are defined as those which have the special general accessory placeholders and are listed among the fixtures in the accessory fixture type priority table. These fixtures typically have accessories but no devices.

The accessory placement algorithm replaces general accessory placeholders with accessories. The accessory placeholder content is placed on the accessory fixture to indicate all the content which needs to replaced.

Accessory Categories are defined in the master list. They are used when a location's fixtures match a '<u>scenario</u>'.

Master List

Name: [    ] Create — 61

- <u>Edit</u> iPhone Other
- <u>Edit</u> Other Cases
- <u>Edit</u> Wall Chargers
- <u>Edit</u> Premium Fixture BT
- <u>Edit</u> Memory
- <u>Edit</u> Data Cables
- <u>Edit</u> iPhone Diamond Side 1 - 12 SKUs
- <u>Edit</u> iPhone Diamond Side 2 - 12 SKUs

FIG. 5b

Scenarios
1. iPhone Diamond Fixture — 67
   Default Scenario Accessory Category list — 42

SKUable Groups

Define groups of content for placement

SKUable Groups define content placeholders on planograms which are eligible for replacement by SKUable content from the master feed.

Each group is defined and named by it's device placeholder.

Device placeholders are created and placed by the person responsible for planogramming.

Choose a piece of content as the SKUable Group Placeholder: [ ] [Add]
- Display Live Bar Device Placeholder
- Display Experience Table Device Placeholder
- Display Laptop Solutions without Live Demo Aircard Device Placeholder
- Display Laptop Solutions without Live Demo Netbook Device Placeholder
- Display Smartphones/Messaging Device Placeholder
- Display Blackberry & More Device Placeholder
- Display Laptop Solutions with Live Demo Device Placeholder
- Display Laptop Solutions without Live Demo Device Placeholder
- Display What's Hot Device Placeholder
- Display iPhone Device Placeholder
- Display Basics & GoPhone Device Placeholder SKUable Exclusions
Exclusion lists
Filtered skuables

FIG. 5c

| HOME | LOCATIONS | PROMOTIONS | FIXTURES | ITEMS | CRITICAL INFORMATION | REFERENCE | S |
| REPORTS | ANNOUNCEMENTS |

SKUABLE GROUP - BASICS & GOPHONE DEVICE PLACEHOLDER
DEFINE GROUPS OF CONTENT FOR PLACEMENT

EACH SKUABLE GROUP HAS 'DEFAULT' OR NATIONAL SETTINGS WHICH CAN BE EDITED.
GEOGRAPHIC FILTERS ARE SET WITH FILTERED SKUABLE GROUPS TO RESTRICT SKU AVAILABILITY IN CERTAIN MARKETS, OVERRIDING THE NATIONAL SETTINGS.

CREATE FILTERED SKUABLE GROUP — 89
FILTERED SKUABLE GROUPS

- (REMOVE) EDIT GEORGIA
- (REMOVE) EDIT AL/MS/LA
- (REMOVE) EDIT KANSAS/MISSOURI
- (REMOVE) EDIT ILLINOIS/WISCONSIN
- (REMOVE) EDIT SAN FRAN/SAC./RENO
- (REMOVE) EDIT WA/ORE/ID/AK
- (REMOVE) EDIT SOUTH FLORIDA
- (REMOVE) EDIT PUERTO RICO/US VI
- (REMOVE) EDIT NORTH FLORIDA
- (REMOVE) EDIT NORTH/SOUTH CAROLINA - SKUTER
- (REMOVE) EDIT NORTH/SOUTH CAROLINA 3G ONLY
- (REMOVE) EDIT OHIO/WESTERN PA.
- (REMOVE) EDIT E.PA/S.NJ/DE
- (REMOVE) EDIT ARIZONA/NEW MEXICO
- (REMOVE) EDIT SOUTH TEXAS
- (REMOVE) EDIT OKLAHOMA/ARKANSAS
- (REMOVE) EDIT ND/SD/NE/MN/IA
- (REMOVE) EDIT MICHIGAN/INDIANA
- (REMOVE) EDIT LOS ANGELES
- (REMOVE) EDIT NORTH TEXAS
- (REMOVE) EDIT VIRGINIA/WEST VIRGINIA (2G)
- (REMOVE) EDIT SAN DIEGO/LAS VEGAS/HAWAII
- (REMOVE) EDIT UPSTATE NY
- (REMOVE) EDIT VIRGINIA/WEST VIRGINIA (3G)
- (REMOVE) EDIT NYC/NORTH NEW JERSEY
- (REMOVE) EDIT MA/RI/VT/NH/ME/CT
- (REMOVE) EDIT WASH D.C./MD
- (REMOVE) EDIT CO/UT/WY/MT
- (REMOVE) EDIT KENTUCKY/TENNESSEE

FIG. 12

SKUable Group

PRESCRIPTIVE SKU PLACEMENT REPLACES PLACEHOLDER CONTENT WITH DEVICES AND ACCESSORIES BASED ON THE SETTINGS MADE HERE.
THE PLACEHOLDER CONTENT'S NAME IS BASICS & GOPHONE DEVICE PLACEHOLDER.
DEFINE BELOW THE WEIGHTINGS TO BE SET AND THEIR RELATIVE PRIORITY OF THE DEVICES FOR THIS SKUABLE GROUP.

LIFESTAGE
SUBCATEGORY — 90
PARENT MODEL
COLOR
EFFECTIVE
DISCONTINUED

LIFESTAGE — CHOOSE A LIFESTAGE
- ACTIVE (83 ITEMS)
- NO BUY (23 ITEMS)
- PRE LAUNCH (3 ITEMS)

BLUETOOTH ACCESSORIES
- (REMOVE) BLUETOOTH HEADSET - MOTOROLA H270 (75180)
- (REMOVE) BLUETOOTH HEADSET - AT&T E220 (71482)
- (REMOVE) BLUETOOTH HEADSET - SAMSUNG WEP301 (75153)
- (REMOVE) BLUETOOTH HEADSET - JABRA BT2080 (75480) — 92
- (REMOVE) BLUETOOTH HEADSET - MOTOROLA H270 (75180)
- (REMOVE) BLUETOOTH HEADSET - PLANTRONICS EXPLORER E210 (75621)
- (REMOVE) BLUETOOTH HEADSET - SAMSUNG WEP301 (75153)
- (REMOVE) BLUETOOTH HEADSET - JABRA BT2080 (75480)
- (REMOVE) BLUETOOTH HEADSET - MOTOROLA H270 (75180)
- (REMOVE) BLUETOOTH HEADSET - PLANTRONICS EXPLORER E210 (75621)
- (REMOVE) BLUETOOTH HEADSET - SAMSUNG WEP301 (75153)
- (REMOVE) BLUETOOTH HEADSET - JABRA BT2080 (75480)

ITEM NUMBER: [____] (ADD)

MEMORY ACCESSORIES
- (REMOVE) MEMORY CARD - SANDISK 2GB SD (71212)
- (REMOVE) MEMORY CARD - SANDISK 4GB SDHC (71595)

ITEM NUMBER: [____] (ADD)

1. NOKIA 6350 RED (65057) (REMOVE)
2. LG NEON WHITE (65009) (REMOVE)
3. PANTECH BREEZE - BLACK (64995) (REMOVE)
4. SONY ERICSSON W518A - BLACK (65024) (REMOVE)
5. SAMSUNG A137 - BLUE (65012) (REMOVE)
6. LG CF360 - BLUE (64958) (REMOVE)
7. SAMSUNG RUGBY - BLACK (64868) (REMOVE)
8. MOTOROLA TUNDRA - GREY (64981) (REMOVE)
9. SAMSUNG A177 - BLACK (65018) (REMOVE)
10. SAMSUNG A777 - BLUE (64923) (REMOVE)
11. NOKIA 2720 (65051) (REMOVE)
12. NOKIA 2330 - GREY (65038) (REMOVE)
13. NOKIA MURAL (65037) (REMOVE)
14. SONY ERICSSON C905A - SILVER (64977) (REMOVE)
15. NOKIA 2680 - BLUE (65016) (REMOVE)
16. SAMSUNG A167 - BLUE (65001) (REMOVE)
17. NOKIA 2320 (65041) (REMOVE)
18. LG SHINE II (65043) (REMOVE)
19. SAMSUNG A237 - BLACK (64870) (REMOVE)
20. SAMSUNG A777 - RED (64924) (REMOVE)
21. SAMSUNG RUGBY - YELLOW (64893) (REMOVE)
22. NOKIA 6350 GREY (65058) (REMOVE)
23. LG CF360 - RED (64967) (REMOVE)
24. SAMSUNG A777 - LIME (64926) (REMOVE)
25. SAMSUNG A777 - ORANGE (64925) (REMOVE)
26. SAMSUNG A237 - RED (64897) (REMOVE)

GENERATING A LAYOUT OF PRODUCTS

TECHNICAL FIELD

This patent application relates generally to generating a layout for products, e.g., at a retail location.

BACKGROUND

Distributors provide products to retailers for sale. Typically, a distributor will provide a number of the latest products to the retailer. The products are often provided without regard to the needs of the retailer. Some of those products are sold by the retailer, and some are not. The surplus that is not sold generally cannot be sent back to the distributor. As a result, the retailer will typically put the surplus "on sale", often at a loss.

Product placement can be key in determining whether a product is sold at the retail level or whether the product remains unsold. A manufacturer may provide guidelines as to how its products are to be displayed. These guidelines may be a result of time and effort spent to determine how to achieve optimal, or at least enhanced, sales based on product placement. However, these guidelines are subject to interpretation. As a result, the actual product display at a retail location may deviate considerably from the one intended by the manufacturer. Currently, the manufacturer is unable to enforce compliance with their guidelines among retail outlets without policing the retail outlets in person. This can be impractical, particularly where there are a large number of retail outlets.

SUMMARY

This patent application describes methods and apparatus, including computer program products, for generating a layout of products.

This patent application describes a method that comprises obtaining attributes of a retail location; correlating the attributes of the retail location to information relating to a product in order to determine whether the product is appropriate for the retail location; and if the product is appropriate for the retail location, generating a layout of the product within the retail location relative to like products according to one or more predefined rules. The method may include one or more of the following features, or any others described in this patent application, either alone or in combination.

The method may comprise associating accessories with the product; and generating a layout of the accessories relative to the product according to one or more other predefined rules. One or more other predefined rules may dictate arranging the accessories proximate to the product if the accessories are usable with the product. The one or more other predefined rules may dictate arranging the accessories proximate to the product if both the accessories and the product are produced by a same manufacturer.

The attributes of the retail location may comprise a geographic location of the retail location, demographics of customers who frequent the retail location, and a display capacity of the retail location. The attributes may be stored in a profile for the retail location, the product may be a cellular telephone, and the profile may identify cellular coverage associated with a geography of the retail location.

Generating the layout may comprise producing a layout plan for the products on a feature at the retail location, the layout specifying where the product is to be located relative to the like products on the features. The method may further comprise communicating the layout electronically to the retail location. The method may comprise receiving, from the retail location, image data showing an actual layout of the product on the feature.

Correlating the attributes may comprise applying one or more filters associated with the retail location prior to generating the layout. The one or more filters may limit the layout.

This patent application also describes a method comprising establishing a profile of a store, where the profile contains information that is based on a geography of the store and demographics of customers who visit the store; populating a database containing (i) rules relating to placement of products and accessories for the products and (ii) filters limiting placement of the products and accessories within certain stores; determining whether a particular product is appropriate for the store based on the profile and attributes of the product; generating a layout for the product within the store using the rules and the filters, the layout being based on a template containing one or more placeholders, wherein, in the layout that is generated, the product is substituted for one of the placeholders; and sending the layout to the store electronically. The method may include one or more of the foregoing features, or any others described in this patent application, either alone or in combination.

Any two or more of the features described in this patent application, including this summary section, may be combined to form embodiments not specifically described in this patent application.

All or part of the foregoing may be implemented as a computer program product comprised of instructions that are stored on one or more machine-readable storage media, and that are executable on one or more processing devices. All or part of the foregoing may be implemented as an apparatus, method, or system that may include one or more processing devices and memory to store executable instructions to implement functionality.

The details of one or more examples are set forth in the accompanying drawings and the description below. Further features, aspects, and advantages will become apparent from the description, the drawings, and the claims.

DESCRIPTION OF THE DRAWINGS

FIGS. 4 to 14 are Web pages that may be used in an example implementation of the system.

DETAILED DESCRIPTION

Described herein is a system for generating a layout of products at a retail location. Generally, the system includes obtaining attributes of a retail location, correlating the attributes of the retail location to information relating to a product in order to determine whether the product is appropriate for the retail location and, if the product is appropriate for the retail location, generating a layout of the product within the retail location relative to like products according to one or more predefined rules. The system may be computer-implemented, at least in part, and may, or may not, be interactive.

The following uses the cellular telephone industry to describe how the system works. In this industry example, the products are cellular telephones and accessories, and the retail locations are stores, such as those for Verizon® and AT&T®.

Figure 1:
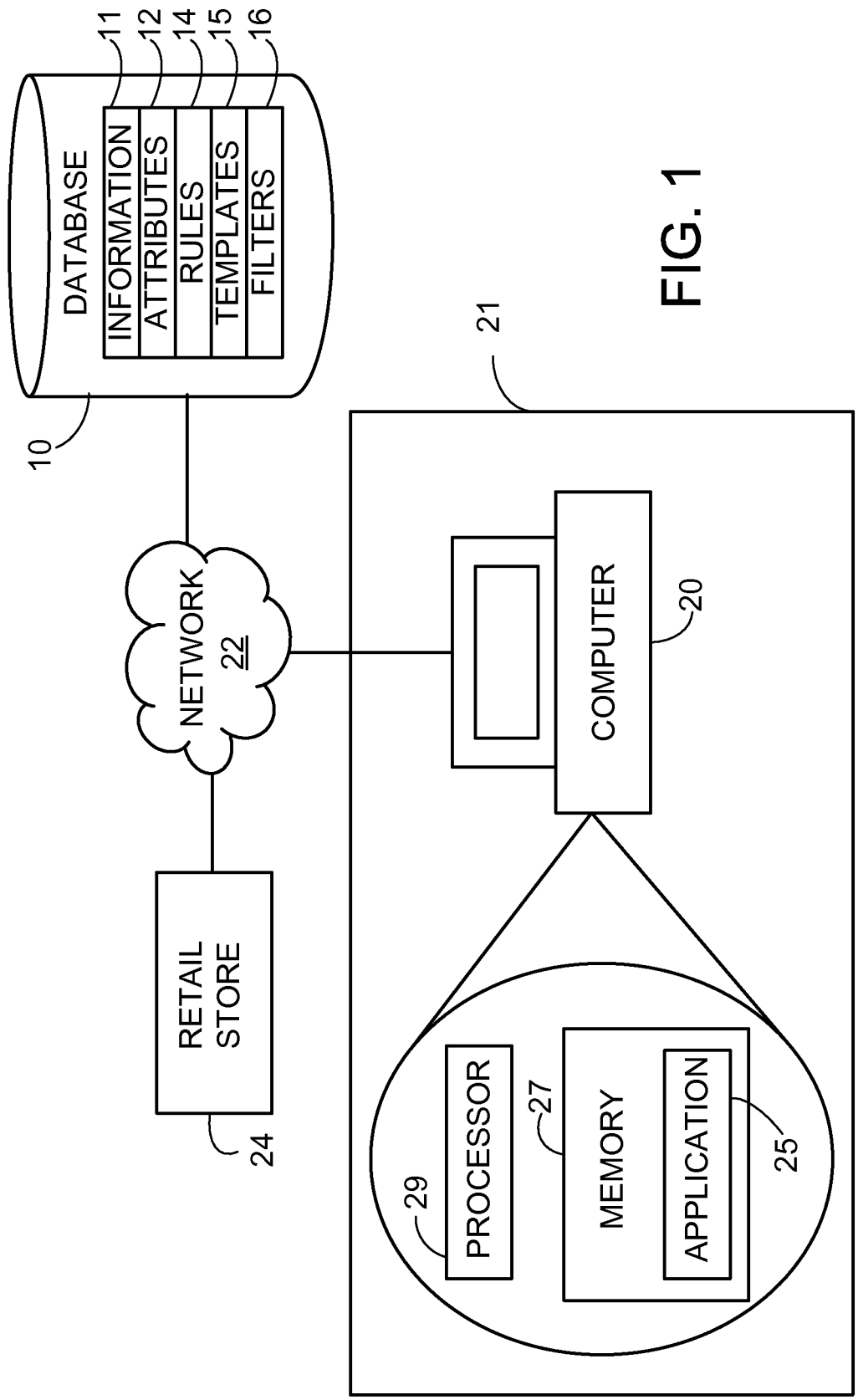
FIG. 1 is a block diagram of a system that may be used for generating product layouts.

The system includes a database 10, an example of which is shown in FIG. 1. Database 10 may store, among other things, information 11 about cellular telephones and their accessories, attributes 12 of retail stores, rules 14 for selecting and arranging cellular telephones and their accessories in the retail stores, templates 15 of fixtures (e.g., kiosks or display walls) within the retail stores, and filters 16 that may limit (or, in some cases, expand) layout of products within one or more retail stores.

Information 11 about a cellular telephone may include any information that identifies the cellular telephone. For example, the information may include the maker of the cellular telephone (e.g., Samsung®, Nokia®, Apple®, etc.), the model name of the cellular telephone (e.g., iPhone®, chocolate phone, Razr, etc.), the model number of the cellular telephone (e.g., SKU—stock keeping unit—number), and the type of cellular telephone (e.g., smart phone, go-phone, 3G phone). There is no limit on the amount and type of information that may be included in the database. For example, the database may also include the colors of the cellular telephones, their cellular carriers (e.g., AT&T®, Verizon®, etc.) their primary and/or secondary functionalities (e.g., plays music), their sizes, the communication schemes that they employ (e.g., CDMA or GSM), and their ability to operate outside the United States.

The information about cellular telephone accessories may include any information that identifies accessories for use with cellular telephones. Typically, the accessories will be for cellular telephones described in the database; however, there is no requirement that this be the case. The information stored in the database may relate to accessories for cellular telephones that are not described in the database, but that nevertheless may be displayed.

As was the case with the information about cellular telephones, the information about the accessories may include the maker of the accessories (e.g., Samsung®, Nokia®, Apple®, etc.), the type of the accessory (e.g., Bluetooth earpieces, headphones, cases, batteries, chargers, car chargers, etc.), the model number (e.g., SKU number) of each accessory, and the identities of cellular telephones with which each accessory will work. There is no limit on the amount and type of information about accessories that may be included in the database. For example, the database may also include the colors of the accessories, cellular carriers (e.g., AT&T®, Verizon®, etc.) associated with the accessories, their functionalities, their sizes, and the like.

Attributes 12 of retail stores may include any information that identifies characteristics of a retail store at which cellular telephones and/or accessories are sold. In this regard, each retail store may have a profile, which is stored in database 10, and which contains the attributes associated with that retail store. Attributes 12 may include the geographic location of the store (e.g., country, city, state, neighborhood, street address), the capacity of the store to sell product (e.g., capacity to display 50 cellular telephones and 150 corresponding accessories), the demographics of people who frequent the store (e.g., college students, young professionals, senior citizens), and the layout of the store, such as the positioning (relative or absolute) of display areas for cellular telephones and accessories vis-à-vis other features of the store, such as a checkout area or service desk. There is no limit on the amount and type of attributes that may be included in the database. For example, the attributes may also identify the physical size of the store, other types of products (e.g., non-cellular-related) that are sold by the store, the rate of inventory turn-over of the store, the sales volume of the store, a break-down of sales by cellular telephone, accessory, or other product, and any other attributes that further characterize the store.

Rules 14 for selecting and arranging cellular telephones and their accessories in the retail stores specify how particular cellular telephones and their accessories are to be arranged in the retail store. The rules may be fixture-specific, meaning that they pertain to a particular fixture or type of display fixture, or they may be generic and simply applied to a particular fixture, type of display fixture, or the store in general. For example, rules may state that a particular type of cellular telephone is to be located at a particular location on a fixture (e.g., iPhones® always must be located on the far right of a fixture), that there must be no more than a particular number of cellular telephones on a fixture (e.g., a fixture must not contain more than five LG® chocolate phones), that the fixture may not contain two types of cellular telephones from the same manufacturer, that accessories for a particular manufacturer must be proximate (e.g., below) a particular cellular telephone from that same manufacturer, and that only accessories used with a particular cellular telephone may be displayed proximate (e.g., below) that cellular telephone. Rules may also specify, e.g., that a particular brand or type of cellular telephone is to be given priority over other cellular telephones in a group (e.g., the priority cellular telephone is to be given the best display position on a fixture), that particular types, colors or brands of cellular telephones are to be grouped for display, and that sub-groups of cellular telephones within a group are to have specific display characteristics. Layouts may then be limited/dictated by this information, regardless of fixture. There is no limit on the amount and type of rules that may be included in the database. Rules may be added, deleted or modified.

Rules for arranging cellular telephone accessories may be similar to those for arranging cellular telephones. The rules for arranging accessories may also specify spatial relationships of accessories to corresponding cellular telephones. For example, a rule may specify that a certain number of iPhone® accessories (e.g., two) must be placed directly below a corresponding iPhone® on a fixture. Another rule may specify what those accessories must be, e.g., a case, a Bluetooth headset, etc. Another rule may specify who the manufacturers of those accessories must be, e.g., only Belkin® accessories. As was the case with cellular telephone rules, there is no limit on the amount and type of rules that may be included in the database. Rules may be added, deleted or modified.

Figure 2:
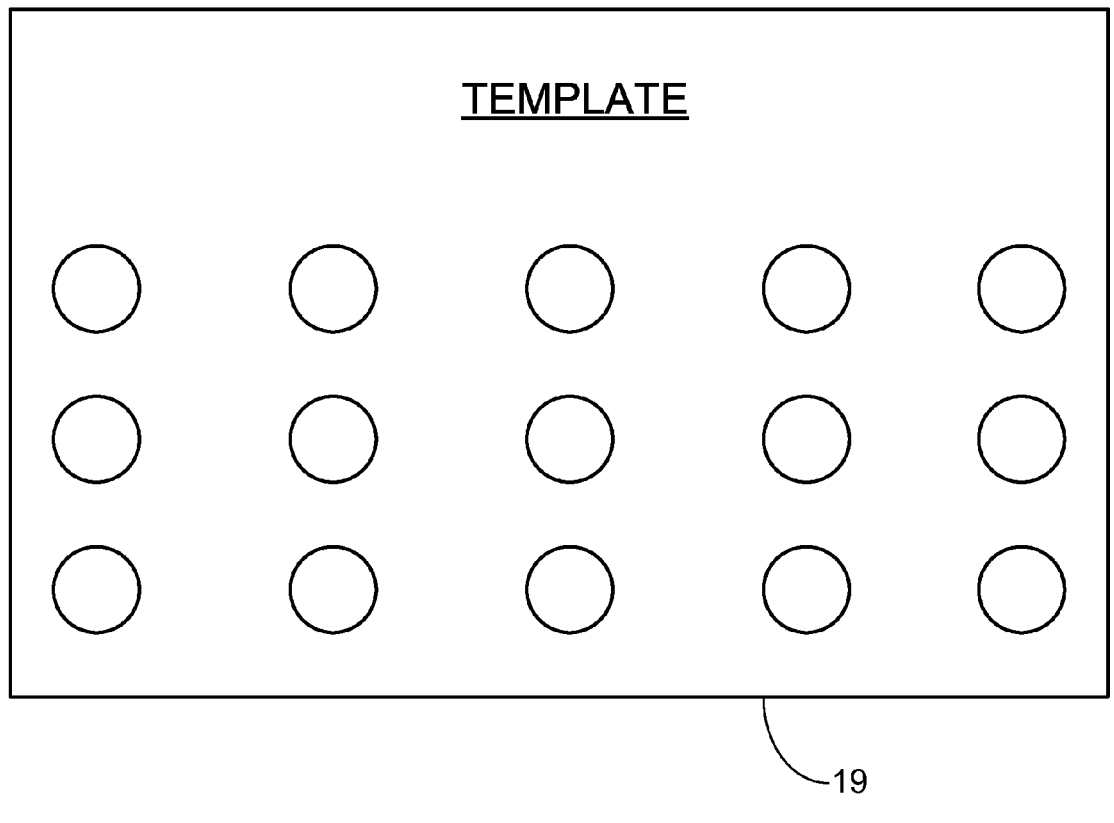
FIG. 2 is an example of a template that may be used in the system.

Database 10 also stores templates 15 of fixtures within the retail stores. Examples of fixtures include a kiosk, a display wall, and a display case. Basically, any structure capable of holding cellular telephones and/or accessories for display qualifies as a fixture. The templates contain placeholders, which specify where, on the fixture, cellular telephone(s) and/or accessory(ies) may be placed. The templates are, essentially, physical layouts of display areas of corresponding fixtures, with placeholders substituted for actual products, here cellular telephones and their accessories. No specific template format is required; however, an example 19 is shown in FIG. 2. In one example, a template is stored for every type of fixture used in a retail stores identified in the database. Each template may contain data that associates it with one or more of those retail stores. Templates may also be stored for portions of fixtures, thereby allowing the system to dictate display on only that portion of a fixture, leaving the remainder of the fixture's display to the retail owner's discretion.

Database 10 also stores filters 16 that may place further restrictions on product distribution and placement. For example, the filters may take into account retail store attributes and cellular telephone and accessory information to determine (e.g., limit or expand) which cellular telephones and accessories can be displayed in a particular retail store. For example, currently, West Virginia does not have 3G network coverage. Accordingly, database 10 may contain a filter that limits retail stores located in West Virginia to non-3G cellular telephones. Another filter might require that retail stores in areas populated predominantly by students receive cellular telephones that have entertainment features, e.g., that are capable of playing music, or not receive primarily business-oriented cellular telephones. Another filter might require that retail stores in low-income areas receive lower-cost cellular telephones or not receive cellular telephones whose cost is above a certain level. Another filter might require that retail stores in areas frequented by businesspeople receive a higher proportion of Blackberry® phones and their accessories. Another filter might require that stores in Massachusetts should receive a particular type of phone, such as an iPhone®. There is no limit on the amount and type of filters that may be included in the database. Filters may be added, deleted or modified.

Filters may also be specified for accessories. In one example, the filters refer to attributes of locations or lists of locations. For example, a filter might identify a town as a university town. Another filter might require that a higher percentage of car chargers be sent to stores located in Los Angeles than to stores located in Boston. As was the case above, there is no limit on the amount and type of filters that may be included in the database. Filters may be added, deleted or modified.

Referring back to FIG. 1, a computer 20 at a central authority 21 may be used to access database 10 (e.g., over network 22) and, based on data contained therein, dictate the amount and types of cellular telephones and accessories to be supplied to a retail store 24, and generate layout(s) for display area(s) within retail store 24. To this end, application 25, which is stored in memory 27 and which executes on processing device 29, identifies retail store 24, e.g., based on user input. The application uses that identity to query database 10 for the profile of the retail store. The application accesses the profile, the rules and the filters, and uses them to generate groups of products and associated accessories that may be used for a particular retail location. The groups may be allocated to specified templates of fixtures at the retail location either automatically or in conjunction with user input.

Figure 3:
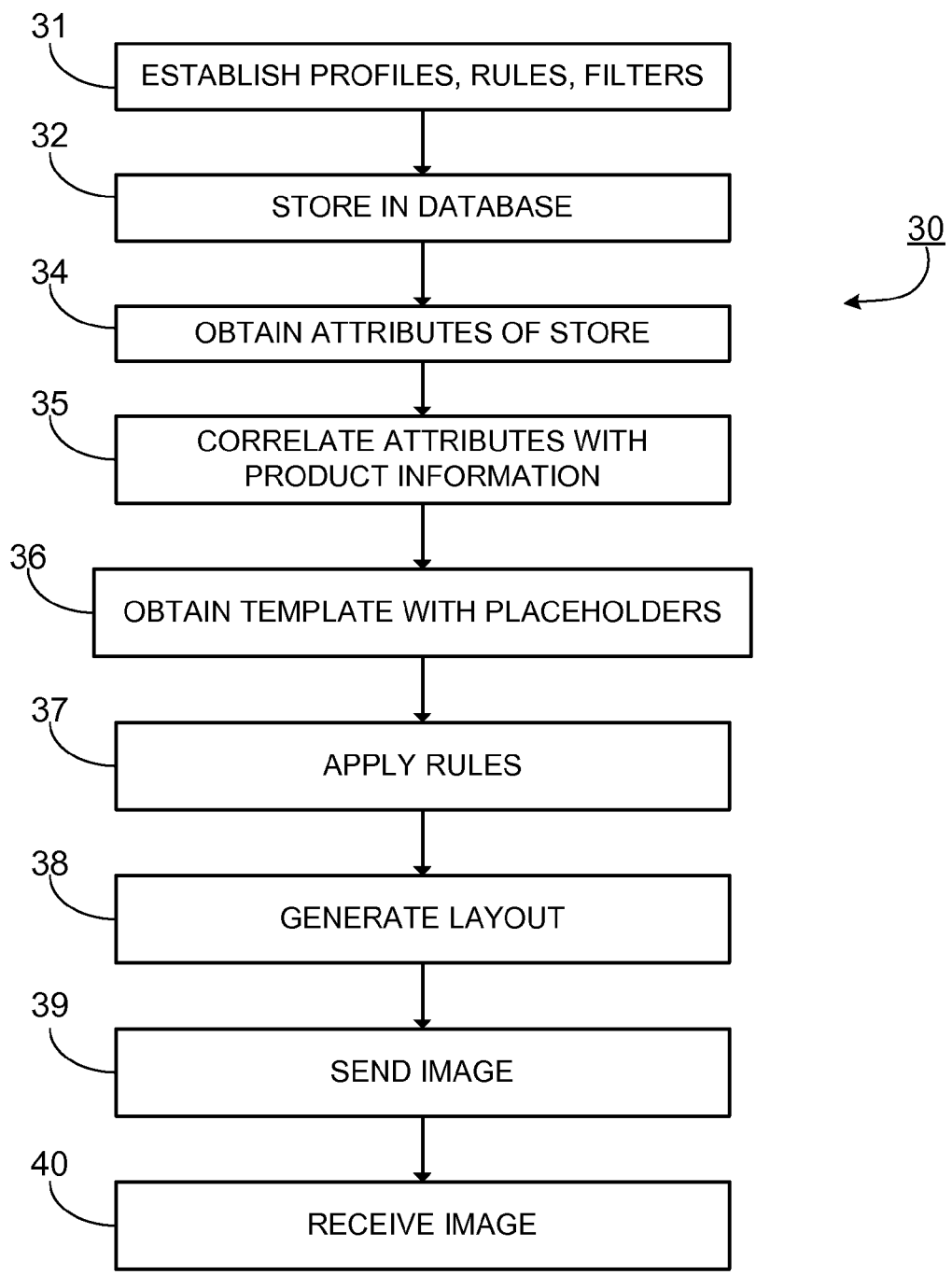
FIG. 3 is a flowchart showing an example implementation of the system.

FIG. 3 is a flowchart showing a process 30 for implementing the foregoing system. As shown in FIG. 3, store profiles are established (31), along with the rules and filters described above. These are all stored (32) in database 10 for later use.

Application 25 obtains (34) attributes of a store, e.g., from the store's profile in database 10. Application 25 correlates (35) the attributes of the store to information relating to products in order to determine which products are appropriate for the store. For example, application 25 may use a store's profile to determine its demographics and then determine if a particular cellular telephone is appropriate for the store. In some implementations, application 25 may allow manual selections to override its determination as to which products are appropriate for a particular store. For example, a user (e.g., retail manager) may designate a product to be appropriate for a store even though application 25 has determined that the product may be inappropriate based, e.g., on the store's demographics.

Application 25 may group products and then use those groups to assign products to a store, and to dictate placement of those products within the store. The groups may be organized based on the application's determination of which products are appropriate for a store, as described above. The groups may be modified based on a user's input, as described above. In addition, a user of application 25 may group products and then use those groups to assign products to the store, and to dictate placement of those products within the store. The groups may be modified through additional, more specific, group settings.

Products in a group (referred to herein as a SKUable group) may be listed according to priority (or any other relative or non-relative indicia, e.g., most expensive, cheapest, etc.). The listings may be used when determining how the products are to be displayed within a store. For example, higher priority products in a list may be granted higher priority positions within a fixture. Other rules, such as those described above, may govern product placement within a store. For example, a rule may state that a highest priority product must be placed on the far left of a fixture, the lowest priority product may be placed on the far right of the fixture, and so on. A user may view these groups and edit them, as desired. For example, a user (e.g., a retail location manager) may decide that a particular product or group should be given a lower priority than that which was allocated. The user may then reassign the priority manually, and the application takes this user assignment into account.

Application 25 obtains (e.g., requests and receives) (36) template(s) of fixture(s) in the store from database 10. If there is more than one fixture, the fixtures themselves may, or may not, be prioritized relative to one another. For example, higher priority fixtures may be for higher priority products, with the highest priority positions within such fixtures being for the highest priority products within a group destined for a fixture. As noted above, templates may be for only parts of a fixture. Parts of a fixture may be designated as higher priority than other parts (e.g., the eye line-of-sight portion of a template may be highest priority). These partial fixture templates may be prioritized and processed as described herein.

Application 25 applies (37) rules, such as those described above, for determining how products from the groups are to be arranged on the templates. For example, a rule may state that a particular type of cellular telephone is to be located at a particular location on a fixture (e.g., iPhones® always must be located on the far right of a fixture). The rules may take into account priorities of the products in the list when determining the final layout. Once the layout is determined, application 25 generates (38) a visual layout of the products on the fixtures. For example, application 25 may substitute identifiers for the products for the corresponding placeholders on templates that correspond to the fixtures.

Application 25 may also generate a layout for accessories corresponding to the products. Application 25 may perform a similar process for the accessories. That is, application 25 may associate accessories with products on a layout based, e.g., on information associated with the products and the accessories. For example, application 25 may determine that certain accessories are appropriate for use with a product in the layout or, e.g., that the accessories are made by the same manufacturer. Application 25 may also apply rules to arrange the accessories relative to the products. For example, a rule may state that an iPhone® case must be below each iPhone® displayed on a fixture. Another rule may state that a most expensive case must be directly below each displayed iPhone®. Taking these rules into account, along with any priority associated with an accessory groups (e.g., the first accessory in a group may be deemed to be highest in priority), application 25 may augment the layout containing the products to include accessories. As noted, identifiers for the accessories may be substituted for placeholders in the template.

In generating the layout for a fixture, application 25 may generate an actual image of how the fixture is to look when all products and their accessories are displayed. This image may be sent (39) electronically to the store at which the fixture is located. An employee at the store may use the image to create the appropriate display. Once the display is created, the employee may send an electronic image of the layout back to the central authority (e.g., via e-mail). The central authority may receive (40) that electronic image. A person or application (e.g., software) at the central authority may compare the electronic image to the generated layout to confirm that the actual display is in compliance with the layout. If it is not, the store may be notified as such, and requested to correct the display. This type of processing may be performed on any type of computing device, such as the iPad®, a desktop or laptop computer, a cellular telephone, etc.

An example of an implementation of the above-described system is as follows.

This implementation includes a number of features involved in placing products (e.g., cellular telephones and their accessories) on fixtures in stores. One feature includes placing products on a fixture in order of priority (e.g., to prioritize the products relative to each other, and to place higher priority products on higher priority locations on the fixture). Other features include, but are not limited to, limiting the distribution of certain products to stores due to constraints, such as legal or business constraints; grouping families of products together (e.g., all LG® cellular telephones); allowing multiple groups of products from the same family to be placed on large fixtures; grouping products together for placement based on attribute category or sub-category; and grouping by SKU number. In this example, products may be associated with multiple merchandising categories to allow them to be placed in multiple ways within a single location, e.g., a retail store.

This implementation includes a number of Web pages that form a graphical user interface for setting parameters which drive the placement of devices and accessories. This implementation imports data, referred to as a feed file, which associates a number of attributes with accessories and devices and is used for grouping and sorting.

This implementation utilizes a data model, which includes locations, fixtures, templates, and content, among other things. The system analyzes the data model to understand where the system is to place devices and accessories on fixtures. Attributes include fixture priority, which is a measure of the importance of a position within a store location, and a content name. In this regard, placeholders which indicate where devices and accessories are placed are specially-named pieces of content. This system uses a specially-maintained table, which indicates accessory fixture priorities for accessory placement separately from the regular fixture priorities used for device placement.

As noted, the system is supported by grouping and sorting processes, and by data feeds from, e.g., database 10, which supply store attributes, product information, and fixture templates. The system defines a SKUable group, which is a group that enables users to drive product placement within a store, e.g., on a fixture in that store. Each such group may be associated with a different merchandising category (e.g., cellular telephone model). A graphical user interface (GUI) allows a user to associate a piece of content, e.g., a placeholder of a template, with an element of SKUable group. A placeholder is positioned in all or some of the places where products that are part of a particular merchandising category should be placed on a fixture. The same GUI may allow products to be placed in a priority-ordered list for the SKUable group. The same product may appear multiple times in the list, and may be selected for fixture placement more than once.

When determining product placement on a fixture (using its template), the system selects all placeholder content for a merchandising category. For example, the system may select all placeholders for cellular telephones (a merchandising category). The system then selects products for those placements using a product list. In this case, the product list may be a prioritized list of products in a SKUable group (e.g., cellular telephones). If the need for products is greater than the length of the list, the list may be re-used from the top. Thus, the system may place the same product from a SKUable group on a fixture more than once.

SKUable group product placements may be sorted and grouped in multiple different ways. For example, there may be a number of different types of SKUable groups. In this example, a first grouping is based on a value of the wall type in the product feed file. In this example, the "wall" type is an attribute of a cellular phone. The value may be arbitrary, and items with the same wall type value may be grouped together. A second grouping is the iteration number, which correlates to when the particular product was taken from a SKUable group product list. If there are more products in the list than placements on a fixture, then the iteration number will be one. In this regard, when there are more products in a SKUable group than places for them on a fixture, the list need not be re-used for further products. When there are fewer products in the SKUable group than places for them, then the list is re-used. A count may be kept as to which re-use an instance of a product came from. This count may be used to group products when they are placed. A third grouping is the family of products, which, in this case, may be a set of names in a column of the product feed file.

The foregoing groups may be sorted in order of priority according to which groups have the highest priority individual group members. For example, groups with higher priority members are given higher priority than groups with lower priority members. Possible places for products in the groups, e.g., template placeholders, may then be sorted by priority of the fixture on which the placeholder is located, and then by the position of the placeholder on the fixture. That is, certain fixtures may be given priority over others. Likewise, certain positions may be given priority over others. The fixtures and their positions for a particular store are sorted accordingly. The placeholder position sorting generally goes by low y ordinates and then low x ordinates (in a graph defined over the fixture, or a portion thereof). However, to allow for the variability of the placement of the placeholders, the y ordinates may be sorted as the same if they are within three units of each other. The list of placeholders and the list of products are then associated, product with placeholder, each in turn. For example, highest priority products are associated with highest priority positions in a highest priority fixture. Next highest priority products are associated with next highest priority positions in the highest priority fixture, and so on, until all fixtures have been filled. As indicated above, if there are not enough products to fill a fixture or all fixtures, the system may proceed through a SKUable group list again and assign products to remaining positions in fixture(s) according to their order of priority.

The system allows products to be excluded from locations (e.g., stores, fixtures, parts of fixtures, etc.) using one or more filters, such as those described above. A filter is applied to a SKUable group to eliminate products which are not appropriate for a location, e.g., based on attributes of the location and information about the product. Resulting filtered SKUable groups may be set as children of a SKUable group and thereby inherit the settings of the parent SKUable group. The product list of the parent SKUable group may be used as the initial product list for the child, but products may be removed from the list, preventing them from being placed in the location under consideration. Lists corresponding to SKUable groups may also be reordered to give them different priorities within the set of locations.

For each location, the system decides whether to use the parent SKUable group or one of its child groups based on whether or not the filter allows/precludes the location. The first filter match selects that filtered SKUable group. If there is no filter match, the parent SKUable group is used. Filters associated with SKUable groups may allow locations and provide product orderings for those locations. When none of the filters allow a location, the unfiltered (parent) SKUable group's product orderings are used. In some implementations, it may be an error if no filter is set. Some implementations, however, may not require filters.

Displaying relevant accessories near to products may support marketing objective(s). For example, from a marketing perspective, it may be advantageous to display iPhone® accessories near (e.g., below, above, side of) actual iPhones®. Accordingly, the system enables accessories to be associated with corresponding products. For example, the system may place accessories in close proximity to (e.g., above, below, to the left or right of) their associated products taking into account, e.g., a user-defined priority of the association. In an implementation, the system may match accessory placeholders with corresponding product(s) based on product and accessory names. A graphical user interface allows accessories to be associated with particular products in a prioritized order. As was the case with products, accessories may be placed on a fixture multiple times. Placeholders for the accessories may be sorted by fixture position (e.g., highest to lowest priority), correlated to the prioritized accessory list, and accessories placed accordingly.

Some accessories may not be associated with specific products, but placing them in close proximity to products can drive sales. The system allows multiple lists of these accessories to be associated with merchandising categories and then generates a placement for those accessories them based on their priority order. Such a placement may be near products that have been associated with the accessories' merchandising type in a user-defined pattern. As above, accessories may appear multiple times on a list. Specific placeholders define where these accessories are placed. Placeholders may be sorted by fixture priority and position and matched with the accessories taken from an accessory list.

Marketing goals for accessory sales can require a complex balance between availability of a wide variety of accessories given a limited space, and preference and prominence for high-margin items. In this implementation, the system supports such marketing goals by allowing definitions of lists of accessories which comprise accessory categories. The system allows these lists to be used in different ways, e.g., to be associated with different sides (e.g., faces or, more generally, portions, e.g., top, bottom, etc.) of a specific accessory fixture; placed in a priority-ordered list of such lists when a specific fixture is present; and placed in a priority-ordered list of such lists in the absence of specific fixtures. For example, the Master List of Accessory Categories (FIG. 9) is a list of accessory categories available to be associated with accessory fixtures. Typical usage associates a single category with each side of a floor fixture. If the floor fixture has four sides then, typically, four accessory categories are associated, one with each side.

After specific accessory categories have been matched with specific accessory fixture sides, a list of accessory lists for fixture matching is consulted. If there were no fixture matching, the default list of accessory lists would be used. In this example, there are two main ways that accessory categories can be associated with accessory fixtures. The first case is triggered by the presence of particular listed fixture types in the store, while the second case is triggered by their absence. In the first case the identified fixtures have particular accessory categories associated with side(s) of the fixture. Then, a list of accessory categories is used to make associations with the sides of the remaining accessory fixtures in the location. In the second case, there is only a list of accessory categories and it is used to make associations with all the accessory fixtures in the store. This list of accessory categories is referred to as the default accessory category list (see, e.g., FIG. 9, FIG. 5c, element 67).

The priority-ordered lists drive the number of times the lists are placed on the currently unplaced accessory fixture sides in a store. This is done by associating the prioritized list of accessory lists with a prioritized list of accessory fixture sides. While this association drives the calculation of the number of times the accessory lists will be used, it does not drive their position. The position is driven by an ordering of the accessory list associations based on the highest priority of the fixture, and then the lowest numbered side, with which they were initially associated.

The foregoing implementation has applicability in any retail situation. For example, the implementation may be applied to ensure that products for a particular promotion are given prominent display on a store's fixture.

Figure 5A:
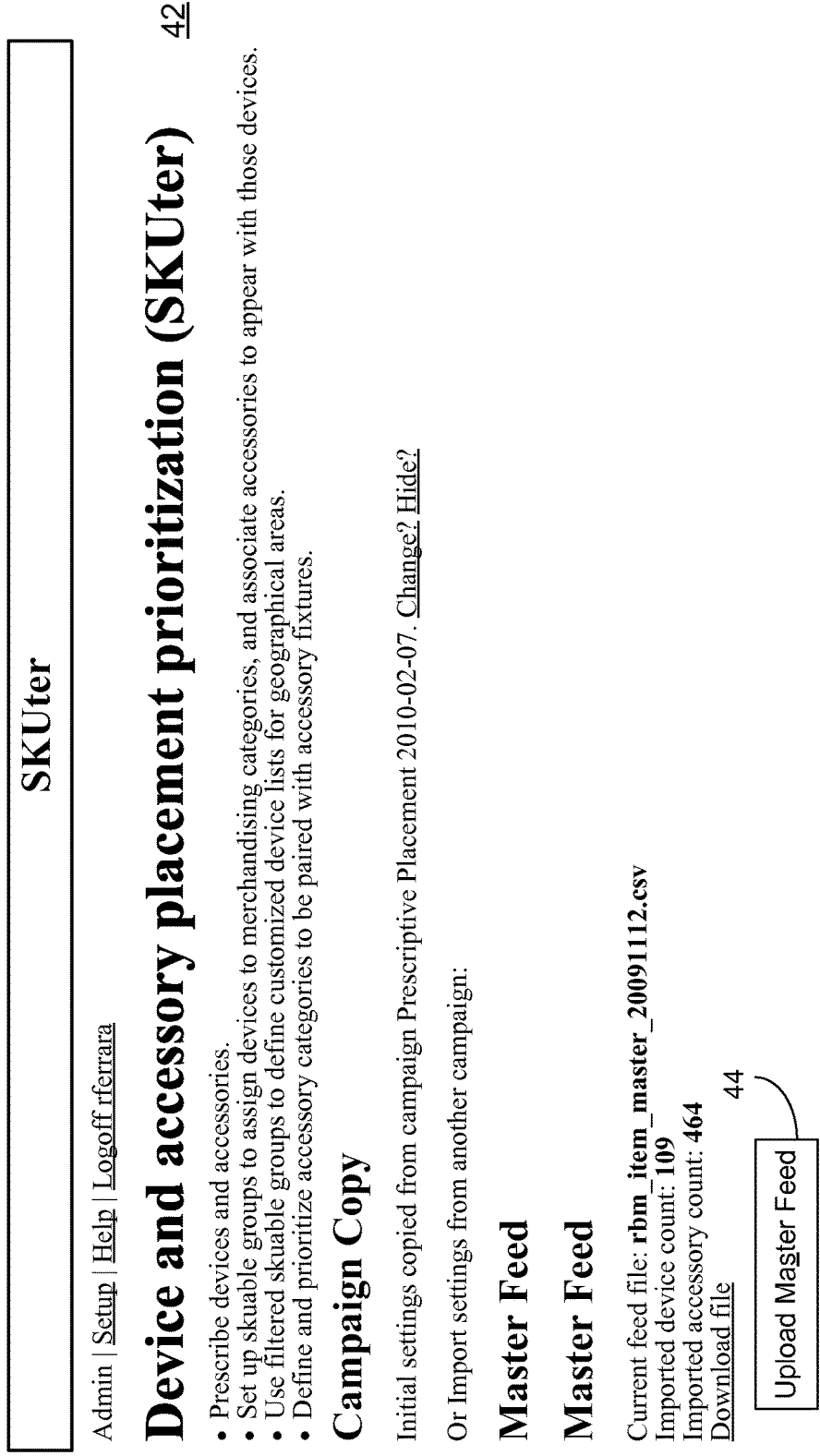
Figure 6:
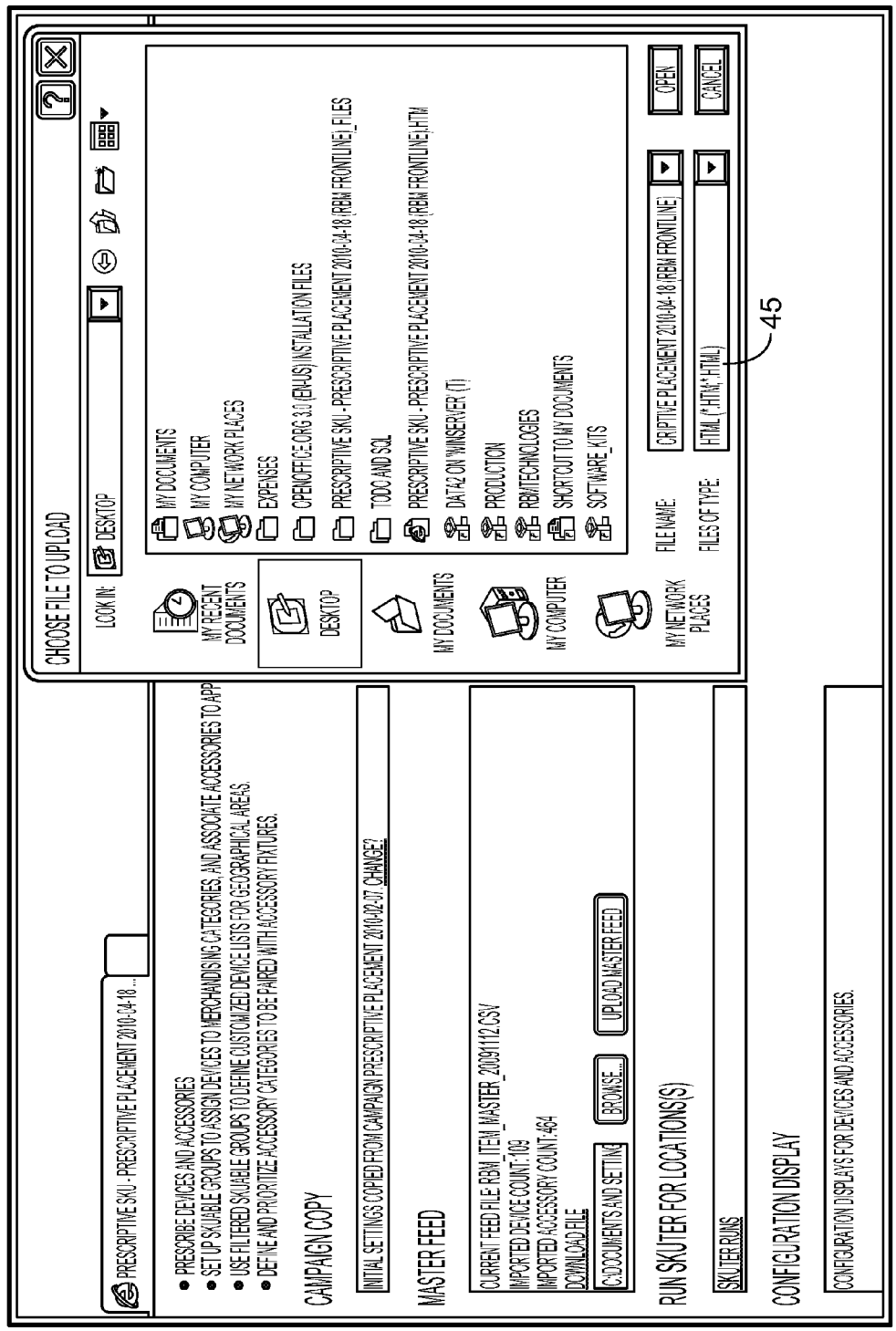

In this example, a display layout is to be generated for one of the promotions 41 (ad campaigns) shown in FIG. 4. To select a promotion for which a layout is to be generated, a user can point and click on the promotion as is done in conventional Web browsing. In response, main control panel 42 of FIGS. 5a to 5c is displayed. Main control panel 42 includes, among other things, an option 44 to load an input file listing products and accessories that are valid for the ad campaign. This option is "Upload Master Feed". Selecting this option 44 triggers the pop-up box 45 of FIG. 6. This pop-up box 45 allows a user to load (e.g., into database 10) listings of products and accessories that are the subject of the ad campaign. The listings may be according to priority. In addition, application 25 may determine which products and accessories are appropriate for which stores, and rules may govern display of those products and accessories on fixtures in such stores.

Figure 7:
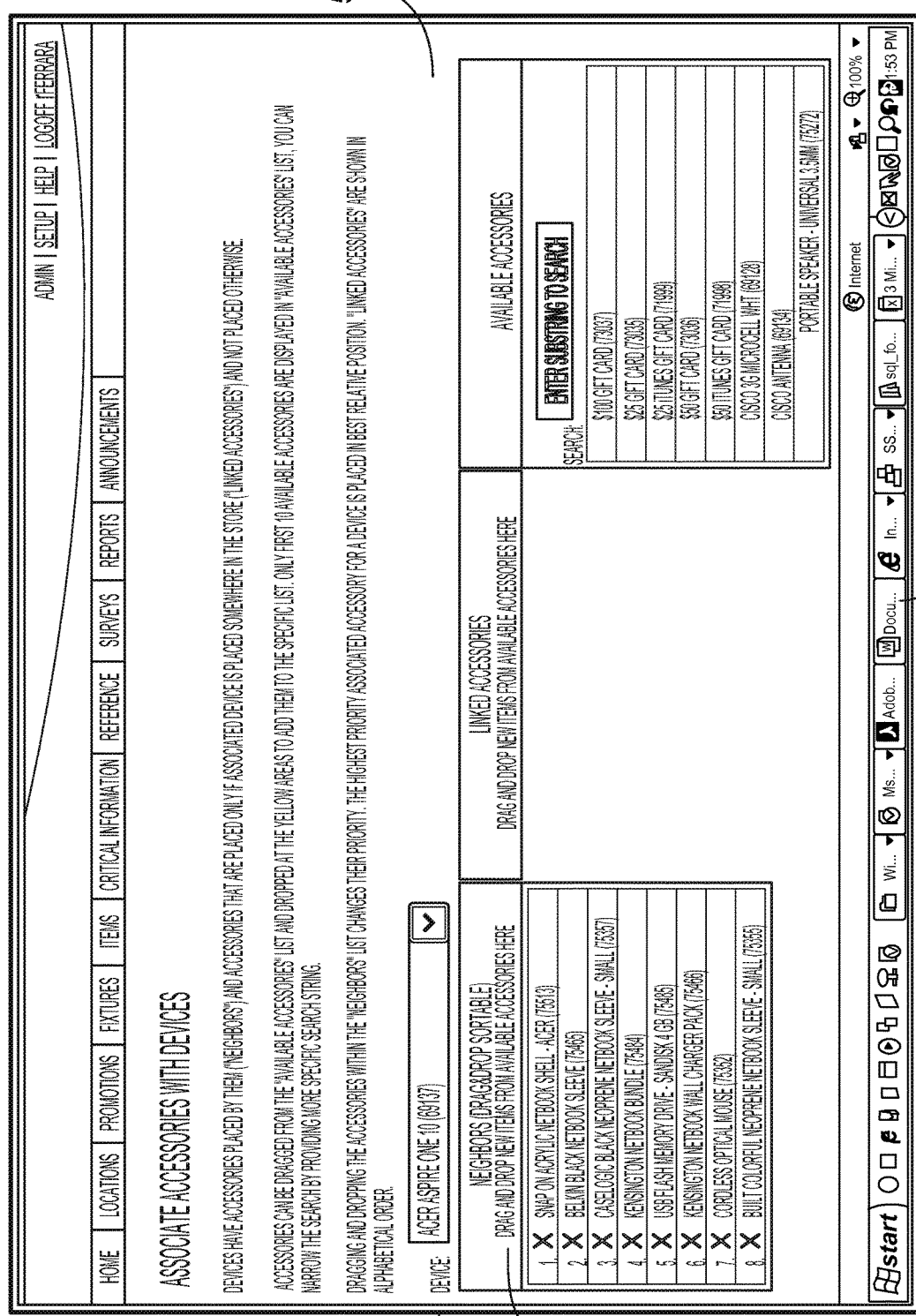

After the input file has been loaded, products and accessories may be associated with each other. This may be done by clicking on link 46 of main control panel 42 (FIG. 5*b*). In response, Web page 47 (FIG. 7) is displayed. The option 49 labeled "Device" allows access to a pull-down menu of all products that are part of the ad campaign, and that were previously loaded via the input file. A user can drag and drop accessories from the available accessories area 50 to the neighbors area 51 to associate accessories to be displayed with the subject product (here, an ACER ASPIRE ONE 10 (69137)). The available accessories may include only those accessories that are appropriate for use with the subject product (as determined according to the processes described herein).

Figure 8:
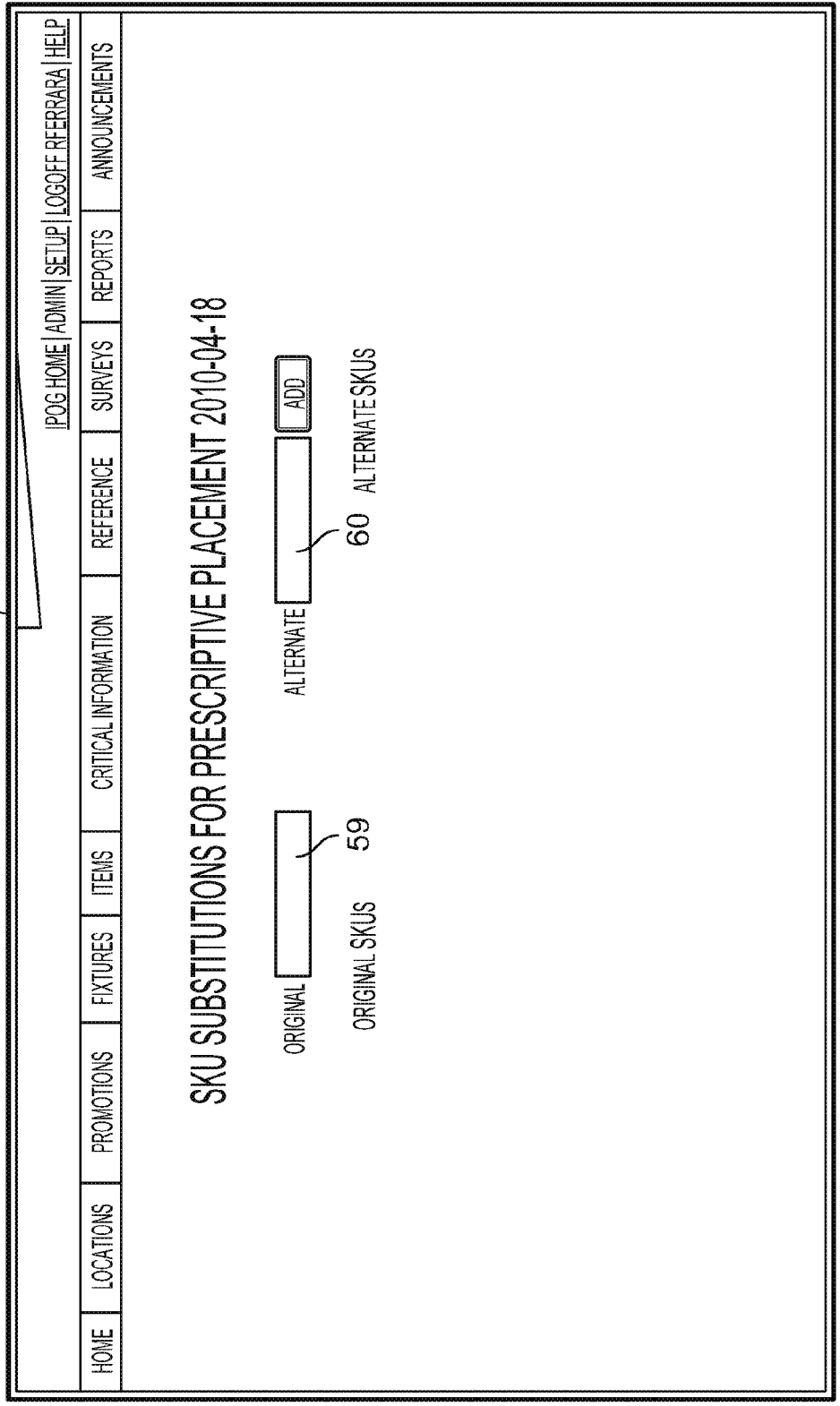

Referring to FIG. 5*b*, a user may click on link 55 to substitute products (defined, e.g., by SKUs) if products associated with an ad campaign are out-of-stock. Clicking on this link triggers Web page 57 of FIG. 8. There, a user can substitute an original product in the original SKUs field 59 with an alternate product in the alternate SKUs field 60. Doing this presents the substitute product as a replacement for the original product.

Figure 9:
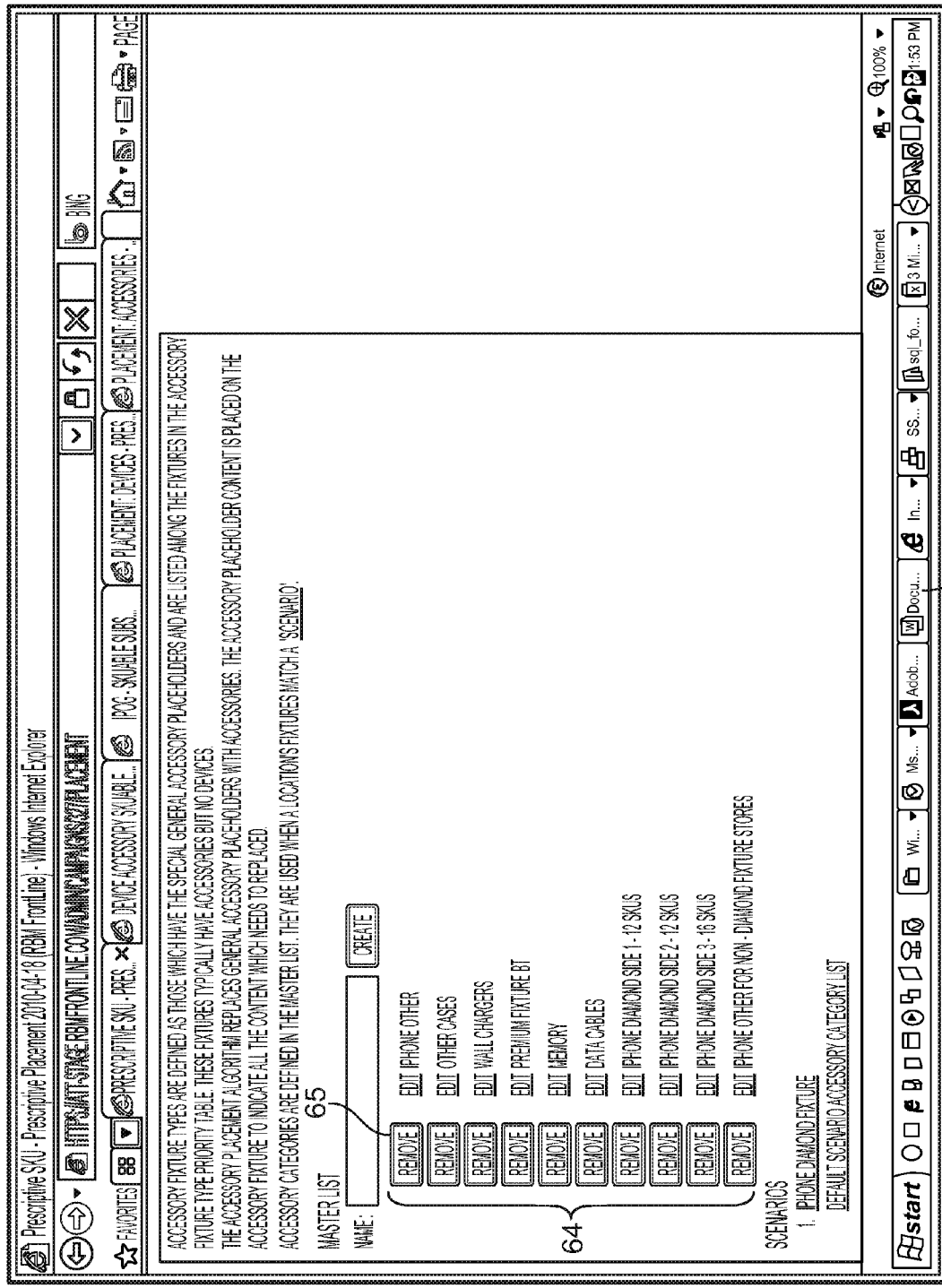
Figure 10:
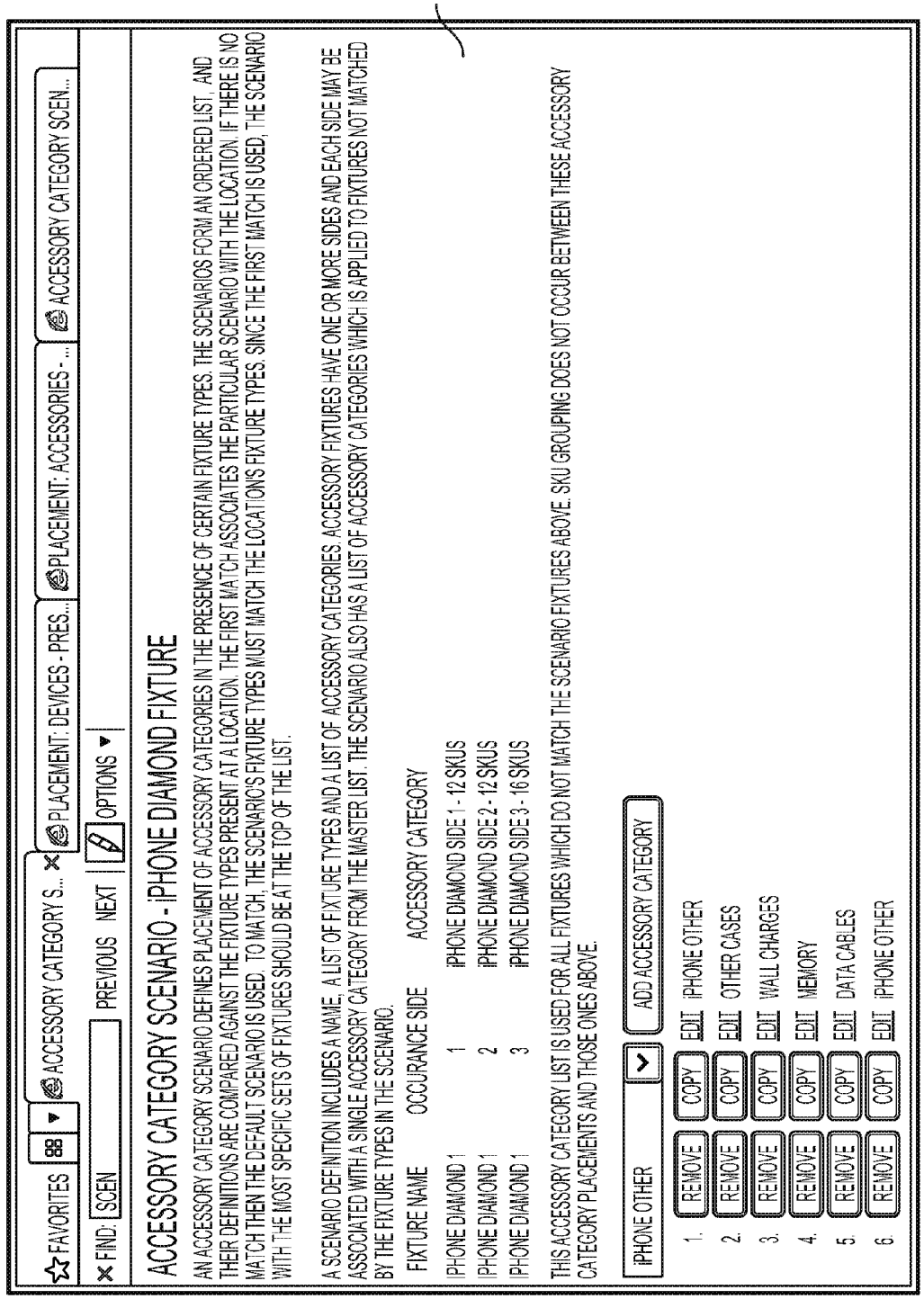

For accessories that have no corresponding products, as shown on main control panel 42, a user may create an accessory-only master list, which may be used to populate a fixture in the manner described herein. Button 61 may be incorporated into Web page 62 (FIG. 9). This user interface of FIG. 9 is for defining accessory categories and, in part, shows a default list of such categories, the "Default Accessory Category List". The categories in this list may be used elsewhere in the user interface, for example, in FIG. 10. The categories may be used to associate accessories to fixtures, and in arranging those accessories on the fixtures.

Referring to FIG. 5*c*, a user may create a scenario for particular location(s). Web page 70 (FIG. 10) may be triggered by clicking on link 67 of main control panel 42. Through Web page 70, a user may create a scenario that determines which categories will be used in a store when that store's fixtures match the specified scenario. For example, a scenario may constitute a layout for a particular fixture, such as a layout for the iPhone® and its accessories on the iPhone® "diamond" fixture.

Figure 11:
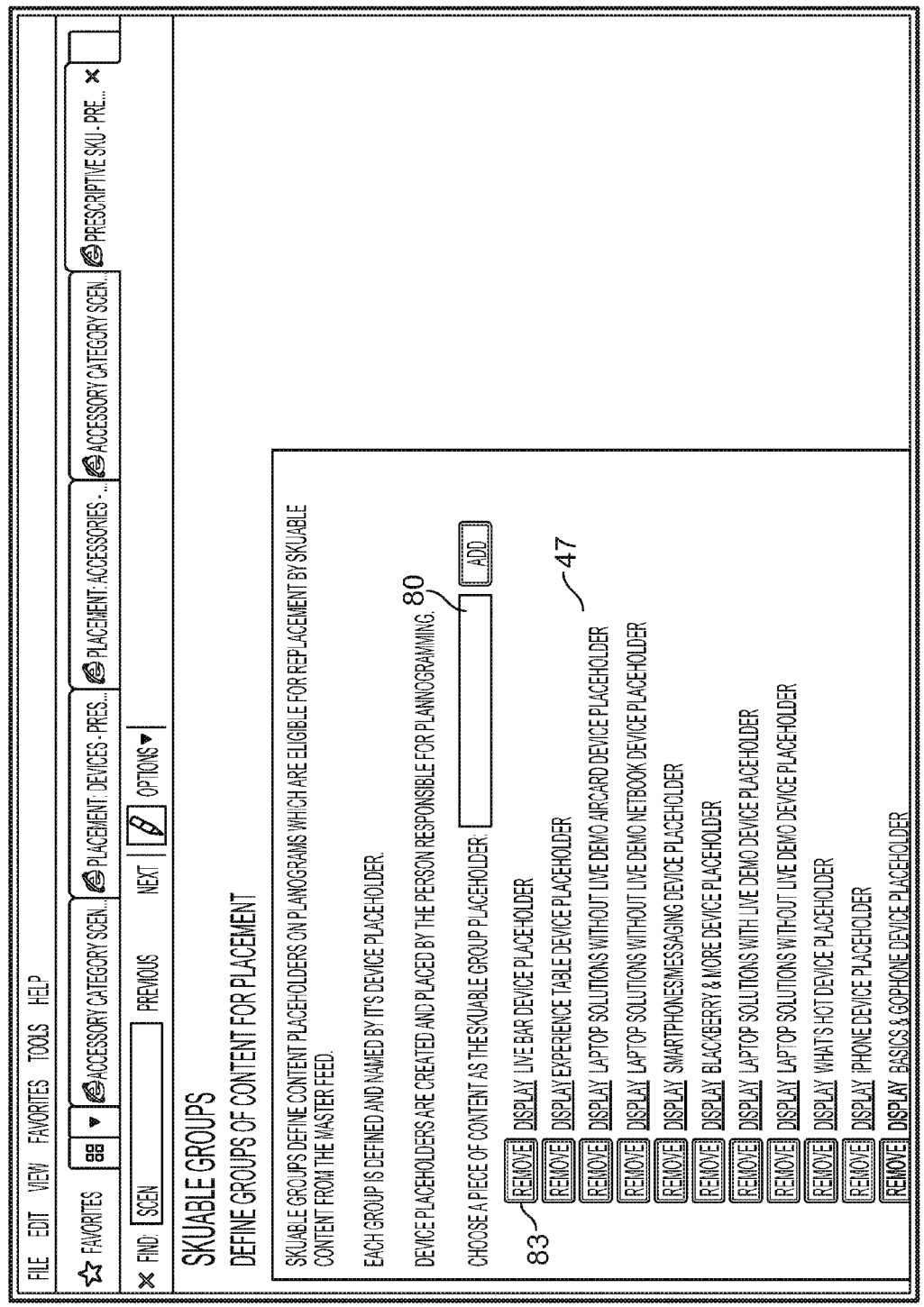

As explained above, the system defines a SKUable Group, which is a group that enables users to drive product placement within a store, e.g., on a fixture in that store. Each such group may be associated with a different merchandising category (e.g., cellular telephone model). A graphical user interface (GUI) allows users to associate a piece of content, e.g., a placeholder of a template, with a SKUable group. FIG. 11 is an example of a GUI that allows a user to define a SKUable group. For example, the definition (e.g., name) of a SKUable group may be added in field 80. The resulting SKUable group may appear in list 81. A SKUable group may be removed by clicking on a remove button 83 corresponding to the SKUable group to be removed.

Figure 14:
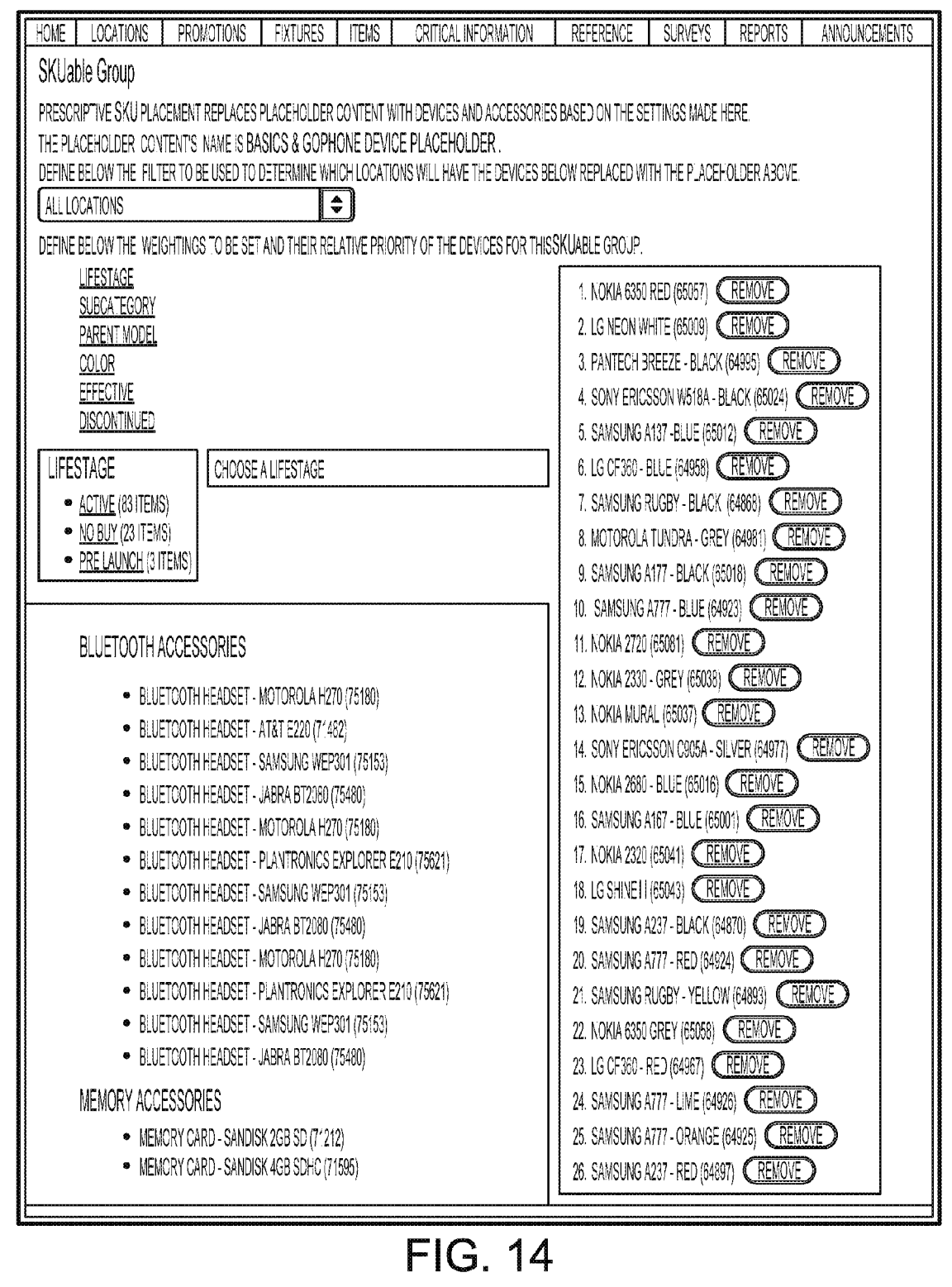

FIG. 12 shows a list of filtered SKUable groups 84 which have a common SKUable group as their parent; and buttons 85 and links 86 for changing/removing the filtered SKUable group(s). FIG. 13 shows a page allowing content of a SKUable Group to be edited—the result of clicking on an "edited" link in FIG. 12. As shown in FIG. 13, different SKUable groups 90 are listed. In this case, the "Basics & GoPhone" SKUable group may be edited by adding or removing elements 91 from the group. Corresponding accessories 92 may also be added/removed. In FIG. 13 "Lifestage", etc., are attributes of devices, e.g., whether devices can no longer be sold ("No Buy") or are not yet launched ("Pre-Launch"). FIG. 14 shows the result of clicking the "Create Filtered SKUable Group" link 89 of FIG. 12, and shows a Web page used to create the SKUable group shown in FIG. 13. Through this page, a user can define the members, priorities, and other information associated with the SKUable group.

All or part of the processes described herein and their various modifications (hereinafter referred to as "the processes") can be implemented, at least in part, via a computer program product, i.e., a computer program tangibly embodied in one or more information carriers, e.g., in one or more tangible machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The term "machine-readable storage media" is not meant to encompass non-statutory subject matter as defined at the time the attached claims are construed. The term "machine-readable storage media", however, is meant to cover any subject matter which is defined as statutory at the times the claims are construed.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

The foregoing implementations describe use of the system in the placement of cellular telephones and their accessories. However, the system may be used to place any product within any retail location. For example, the system may be used to place other types of electronics, clothing, food, shoes, automobile accessories, furniture, toiletries, etc. The system likewise may be used with any type of retail location, whether generalized, such as Wal-Mart®, or specialized, such as the cellular telephone outlets described herein.

Elements of different implementations described herein may be combined to form other implementations not specifically set forth above. Other implementations not specifically described herein are also within the scope of the following claims.

What is claimed is:

1. A method comprising:
  receiving by one or more computing systems, assignments of products to product groups that group products according to characteristics of the products, and with the products ordered in the product groups according to a priority;
  accessing by the one or more computing systems, a database storing templates, with the templates corresponding to physical layouts of display areas of corresponding fixtures, and the templates containing placeholders in positions that are substitutes for actual products and, which placeholders specify placement locations and placement priorities of products on a given one of the corresponding fixtures;
  for a given one of the corresponding fixtures
  selecting one or more of the templates; for the selected one or more templates,
    populating by the one or more computing systems, a graphical user interface with one or more listings of products from one or more of the product groups;
    associating by the one or more computing systems products in a given one or more of the product groups according to the ordered priority, with one or more corresponding placeholders in the selected one or more templates, according to the placement priorities of the placeholders;
    determining by the one or more computing systems layout information of the fixture based at least in part on the one or more templates;
  generating from the determined layout information by the one or more computing systems, data to produce a first electronic image for the determined layout of the fixture showing placement of the associated products on the fixture;
  electronically sending the first electronic image of the generated layout to an electronic device;
  receiving by the one or more computer systems a second electronic image representing an actual layout of products at the store;
  comparing the first image of the generated layout to the second image of the actual layout; and
  sending a notification to the store based on comparing the first image with the second image.

2. The method of claim 1, further comprising:
  accessing by the one or more computing systems, a table of related products that have a relationship to the product groups, with the table including priorities for related product placements; and
  wherein the related products comprise accessories, and a rule dictates arranging accessories in corresponding placeholders of the one or more selected templates proximate to a corresponding product if the accessories are usable with the corresponding product.

3. The method of claim 1, further comprising:
  accessing by the one or more computing systems, a table of related products that have a relationship to the one or more product groups, with the table including priorities for related product placements;
  wherein the related products comprise accessories, and a rule dictates arranging accessories in corresponding placeholders of the selected one or more templates proximate to a product if both the accessories and the product are produced by a same manufacturer.

4. The method of claim 1, further comprising:
  analyzing by the one or more computing systems a data model to determine product placements, and a store profile comprising information identifying attributes including fixtures, a geographic location, and demographic information of customers who visit the store, with analyzing of the data model determining the assignments for the products for placement based on the store profile.

5. The method of claim 1, wherein generating the layout comprises:
  accessing by the one or more computing systems, a table of related products that have a relationship to the one or more product groups, with the table including priorities for related product placements;
  determining by the one or more computing systems, the layout of the fixture based at least in part on the one or more templates, a first set of rules for the product groups according to priorities for the products in the product group, and a second set of rules for related products associated with the products according to priorities for the related products obtained from the table;
  producing a layout plan according to the given fixture, the layout plan specifying where the products are located on the given fixture based on the priorities of the products and related products.

6. The method of claim 4, wherein the products include a cellular telephone, and the store profile identifies cellular coverage associated with a geography of the store.

7. One or more non-transitory machine-readable media storing instructions that are executable by one or more processing devices to perform operations comprising:
  analyzing by a data model a profile of a store, the profile comprising information identifying attributes including fixtures, a geographic location, and demographic information of customers who visit the store for providing results identifying product placements in the store, and with the results including assignments of products to product groups by grouping identified products into the product groups, according to a plurality of characteristics of the products, with each product group containing products having a common characteristic, and with the common characteristic being different for each product group, and with the products ordered in the product groups according to a priority;
  accessing a database storing templates, with templates corresponding to physical layouts of display areas of corresponding fixtures, and the templates containing placeholders in positions that are substitutes for actual products and, which placeholders specify placement locations and placement priorities of products on a given one of the corresponding fixtures;
  selecting one or more templates; for the selected one or more templates, accessing a table of related products having a relationship to the product groups, with the table indicating priorities for related product placements;

populating a graphical user interface with one or more listings of products from one or more of the product groups and a listing of related products from the table;

associating the products in the one or more the product groups, according to the ordered priority, with one or more corresponding placeholders in the selected one or more templates, according to the placement priorities of the placeholders and the related products from data entered into the graphical user interface;

determining a layout of the fixture based at least in part on the one or more templates, a first set of rules for the products according to the priorities for products in the product groups, and a second set of rules for the related products that are associated with the products according to the priorities for the related products obtained from the table;

generating from the determined layout information data to produce a first electronic image for the determined layout of the fixture, with the first electronic image showing placement of the associated products and the associated related products on the fixture;

electronically sending the first electronic image of the generated layout to an electronic device;

receiving by the one or more computer systems a second electronic image representing an actual layout of products at the store;

comparing the first image of the generated layout to the second image of the actual layout; and sending a notification to the store based on comparing the first image with the second image.

8. The one or more non-transitory machine-readable media of claim 7, wherein the related products comprise accessories, and a rule dictates arranging accessories proximate to a product if the accessories are usable with the product.

9. The one or more machine-readable media of claim 7, wherein the related products comprise accessories, and a rule dictates arranging accessories proximate to a product if both the accessories and the product are produced by a same manufacturer.

10. The one or more non-transitory machine-readable media of claim 7, wherein the attributes of the store comprise a display configuration of the store and one or more priorities associated with the display configuration.

11. The one or more non-transitory machine-readable media of claim 7, wherein generating the layout comprises:
producing a layout plan according to the given fixture, the layout plan specifying where the products are located on the given fixture based on the priorities of the products.

12. The one or more non-transitory machine-readable media of claim 7, wherein the products include a cellular telephone, and the profile identifies cellular coverage associated with a geography of the store.

13. A system comprising:
memory storing instructions that are executable; and
one or more processing devices to execute the instructions to perform operations comprising:
analyzing by a data model a profile of a store, the profile comprising information identifying attributes of the store, the attributes comprising at least a geographic location of the store and demographic information of customers who visit the store to provide results identifying product placements in the store, and with the results including assignments of products to product groups by grouping identified products into the product groups, according to a plurality of characteristics of the products, with each product group containing products having a common characteristic, and with the common characteristic being different for each product group, and with the products ordered in the product groups according to a priority;

accessing a database storing templates, with templates corresponding to physical layouts of display areas of corresponding fixtures, and the templates containing placeholders in positions that are substitutes for actual products and, which placeholders specify placement locations and placement priorities of products on a given one of the corresponding fixtures;

selecting one or more templates according to a fixture in the store; for the selected one or more templates, accessing a table of related products having a relationship to the products, with the table indicating priorities for related product placements;

populating a graphical user interface with one or more listings of products from one or more of the product groups and a listing of related products from the table;

associating the products in one or more of the product groups, according to the ordered priority, with one or more corresponding placeholders in the selected one or more templates, according to the placement priorities of the placeholders and the related products, from data entered into the graphical user interface;

determining a layout of the fixture based at least in part on the one or more templates and a first set of rules for the products according to the priorities for products in the product groups, and a second set of rules for the related products that are associated with the products according to the priorities for the related products obtained from the table; and generating from the determined layout information data to produce a first electronic image for the determined layout for the fixture, with the first electronic image showing placement of the associated products on the fixture and the associated related products;

electronically sending the first electronic image of the generated layout to an electronic device;

receiving by the one or more computer systems a second electronic image representing an actual layout of products at the store;

comparing the first image of the generated layout to the second image of the actual layout; and sending a notification to the store based on comparing the first image with the second image.

14. The system of claim 13, wherein the related products comprise accessories, and a rule dictates arranging accessories proximate to a product if the accessories are usable with the product.

15. The system of claim 13, wherein the related products comprise accessories, and a rule dictates arranging accessories proximate to a product if both the accessories and the product are produced by a same manufacturer.

16. The system of claim 13, wherein the attributes of the store comprise a display configuration of the store and one or more of the priorities associated with the display configuration.

17. The system of claim 13, wherein generating the layout comprises producing a layout plan according to the given fixture, for the products, the layout plan specifying where each product is located on the given fixture based on the priorities of the products and related products.

18. The system of claim 13, wherein the products include a cellular telephone, and the profile identifies cellular coverage associated with a geography of the store.

\* \* \* \* \*